US012651674B2

(12) United States Patent
You

(10) Patent No.: US 12,651,674 B2
(45) Date of Patent: Jun. 9, 2026

(54) METHOD FOR TREATING A METAL PART OF A PRIMARY CIRCUIT OF A WATER-COOLED NUCLEAR REACTOR

(71) Applicant: COMMISSARIAT A L'ENERGIE ATOMIQUE ET AUX ENERGIES ALTERNATIVES, Paris (FR)

(72) Inventor: Dominique You, Gif sur Yvette Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 306 days.

(21) Appl. No.: 18/354,998

(22) Filed: Jul. 19, 2023

(65) Prior Publication Data

US 2024/0312652 A1 Sep. 19, 2024

(30) Foreign Application Priority Data

Jul. 20, 2022 (FR) ...................................... 22 07411

(51) Int. Cl.
*G21C 17/022* (2006.01)

(52) U.S. Cl.
CPC ................................ *G21C 17/0225* (2013.01)

(58) Field of Classification Search
CPC .................................................. G21C 17/0225
See application file for complete search history.

(56) References Cited

U.S. PATENT DOCUMENTS 4,526,626 A 7/1985 Carter
5,015,436 A * 5/1991 Nagase .................. G21C 15/28 376/307
2008/0075886 A1 3/2008 Nagase et al.
2009/0141849 A1* 6/2009 Hosokawa ................ G21F 9/06 376/305
2017/0287573 A1* 10/2017 Ishida ....................... C02F 1/72

FOREIGN PATENT DOCUMENTS

WO WO-2013093382 A1 * 6/2013 ......... G21C 17/0225

OTHER PUBLICATIONS

French Preliminary Search Report issued Mar. 9, 2023 in French Application 22 07411 filed on Jul. 20, 2022, 9 pages (with English Translation of Categories of Cited Documents and Written Opinion).

* cited by examiner

*Primary Examiner* — Sharon M Davis

(74) *Attorney, Agent, or Firm* — Oblon, McClelland, Maier & Neustadt, L.L.P.

(57) ABSTRACT

A method treats an internal surface of a metal part made from a nickel-based or cobalt-based alloy of a primary circuit during an operating cycle of a PWR reactor. The method includes estimating a quantity of nickel discharged into the primary circuit by the metal parts of the primary circuit in contact with water of the primary circuit, during an operating cycle of the reactor; calculating a quantity of magnetite necessary for fixing the whole of the quantity of nickel estimated; forming a treated water by dissolving the quantity of magnetite calculated in the water of the primary circuit when the water has a temperature of between 80° C. and 180° C.; and putting this treated water in circulation in the primary circuit so as to form, on the internal surface of at least one metal part, a layer of a protective oxide to fix the quantity of nickel estimated.

11 Claims, 1 Drawing Sheet

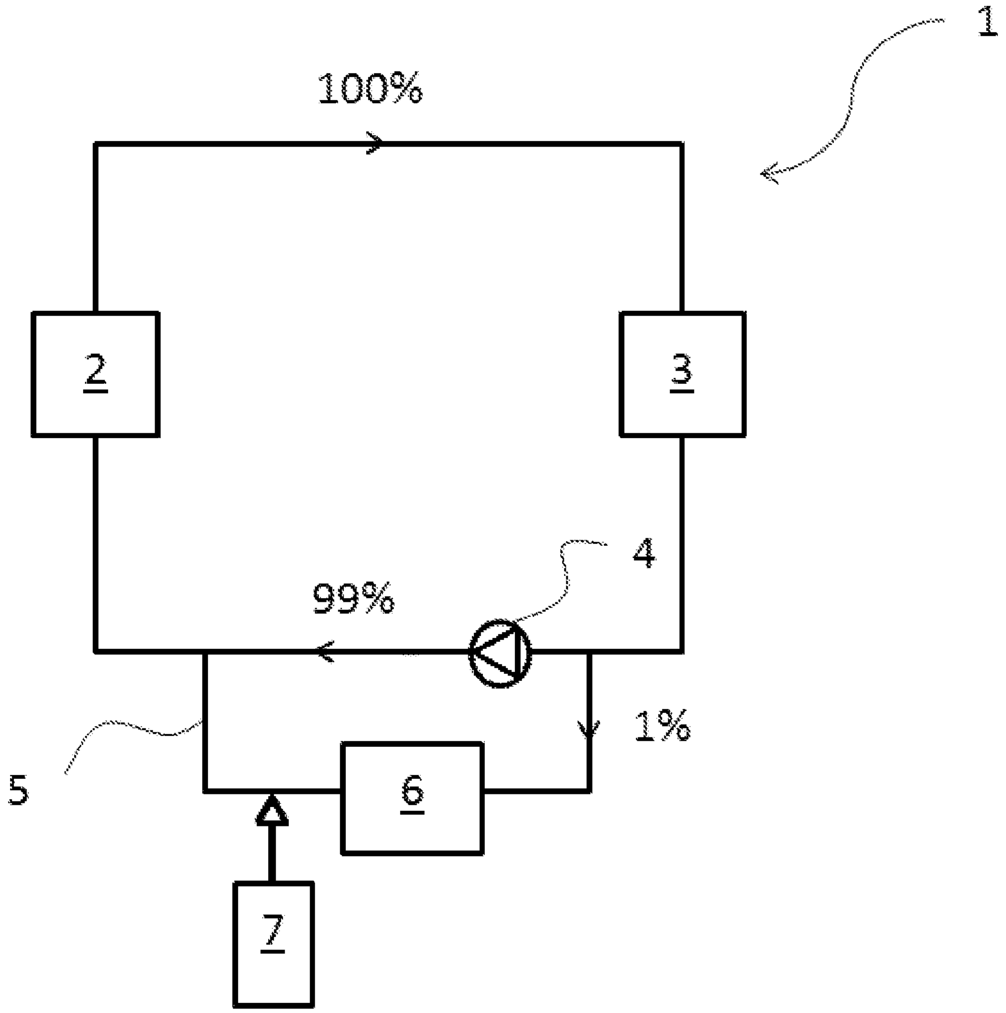
1
100%
2
3
4
99%
1%
5
6
7

METHOD FOR TREATING A METAL PART OF A PRIMARY CIRCUIT OF A WATER-COOLED NUCLEAR REACTOR

TECHNICAL FIELD

The field of the invention is that of methods for treating the primary circuit of a nuclear reactor using water as a heat-transfer medium.

The invention relates in particular to improving the behaviour of the metal parts of the primary circuit, such as the tubes of the steam generators, the pumps and fittings of the primary circuit of the nuclear reactors, with respect to the release of the corrosion products responsible for contaminating the primary circuit.

PRIOR ART

In a nuclear reactor using water as a heat transfer medium, the water circulates in a closed circuit (called the primary circuit) that passes through the core of the reactor and a steam generator. The primary circuit also includes other metal parts, such as primary pumps (i.e. pumps of the primary circuit, hereinafter "pumps"), fittings (valves, etc) and water-circulation pipework.

In the vessel of the reactor in operation, the water of the primary circuit recovers the heat produced by the nuclear fission reactions of the nuclear fuel. It is then generally at a temperature between 286° C. and 330° C.

It should be noted that, in the present disclosure, the expression "between . . . and . . . " must be understood as including the bounds.

By means of pumps, the water of the primary circuit leaves the vessel of the reactor and enters the tubes of the steam generator. In these tubes, it exchanges its heat with the water of another circuit, referred to as the secondary circuit, in order to generate steam, which drives a turbo-alternator unit intended to produce electricity.

The high temperature and pressure conditions of the water of the primary circuit causes in particular widespread corrosion of the alloy constituting the tubes of the steam generator.

The alloy of the tubes of the steam generator generally contains a percentage by weight of nickel of between 60% and 75%; the corrosion thereof therefore results in the discharge of the nickel element into the water of the primary circuit, by dissolution of some of the corrosion products.

When the water of the primary circuit then circulates in the core of the reactor, the nickel is irradiated and produces radioactive cobalt 58 ($^{58}Co$), which can in its turn contaminate the whole of the primary circuit (including the steam generator), by incorporation of the cobalt in the layer formed by the corrosion products.

The same transfer mechanism occurs between the water of the primary circuit and the cobalt-based alloys that are used in the fittings and pumps of the primary circuit. This is because a discharge occurs of the cobalt element into the water of the primary circuit, by dissolution of some of the corrosion products of these cobalt-based alloys.

When the water of the primary circuit then circulates in the core of the reactor, the cobalt is irradiated and produces radioactive cobalt 60 ($^{60}Co$), which can in its turn contaminate the whole of the primary circuit (including the steam generator), by incorporation of the cobalt in the layer formed by the corrosion products.

However, before taking action to reload the nuclear fuel and carry out periodic maintenance on the primary circuit and on the steam generator, the operator of the nuclear reactor must ensure that the radioactivity has sufficiently decreased. This contamination of the primary circuit results in an increase in the waiting time for reduction in the radioactivity, and therefore in a loss of time and therefore of significant operating revenues.

It is therefore necessary to limit the quantity of cobalt 58 and 60 in the primary circuit, by best avoiding discharging firstly nickel into the water of the primary circuit by corrosion of the alloy constituting the tubes of the steam generator and secondly cobalt into the water of the primary circuit by corrosion of the alloy constituting the pumps and fittings of the primary circuit.

In the patent application WO 2013/093382 A1, the Applicant proposed a treatment method for limiting at source the discharges, into the primary circuit, of nickel resulting from the corrosion of a steam generator tube, in order to limit the resulting contamination by radioactive cobalts.

This method for treating the internal surface of a steam generator tube of a water-cooled nuclear reactor comprises a prior step of forming a treated water obtained by introducing, into the water of the primary circuit of the reactor when the water has a temperature of between 80° C. and 180° C., a quantity of magnetite ($Fe_3O_4$), and a step of circulating this treated water in the primary circuit, so as to put the treated water in contact with the internal surface of the steam generator tube, by means of which the treated water forms, on the internal surface, a layer of a protective oxide for fixing all or part of the quantity of nickel liable to be discharged into the primary circuit by the alloy constituting the steam generator tube during an operating cycle of the reactor.

The quantity of magnetite introduced into the water of the primary circuit is therefore selected so that treated water makes it possible to form, on the internal surface of the tube, a layer of a protective oxide for fixing all or part of the nickel liable to be discharged into the primary circuit by the alloy constituting the steam generator tube during an operating cycle of the reactor.

However, this method, although effective, loses effectiveness over the course of time.

This is because, in a known manner, the primary fluid is continuously purified. More precisely, a portion of the water circulating in the primary circuit (primary fluid) is diverted into a so-called chemical and volumetric control (RCV) auxiliary circuit that is disposed adjacent to the primary circuit and makes it possible in particular, using purification means (mechanical filters and demineralisers lined with ion exchange resins), to purify (scrub) the water of the primary circuit.

Thus the quantity of $Fe_3O_4$ that is introduced at the start of the operating cycle (namely when the reactor is started up, a period during which the water has a temperature of between 80° C. and 180° C.) will gradually decrease over time, because of the purification action of the RCV circuit during the operating cycle of the reactor, the role of the RCV being, among other things, to eliminate the corrosion products solubilised in the water of the primary circuit, including the intentionally introduced magnetite.

DESCRIPTION OF THE INVENTION

The Inventors have set themselves the aim of improving the method of the Applicant by proposing a treatment method for even better limiting at source the discharge, into the primary circuit, of nickel resulting from the corrosion of a steam generator tube or of cobalt resulting from the corrosion of the pumps and fittings of the primary circuit, in order to limit the resulting contamination by cobalt 60 and cobalt 58, coming respectively from the activation of the cobalt and nickel.

More generally, the aim of the invention is to reduce the release of corrosion products into the water of the primary circuit, which are responsible for transferring contamination into the nuclear reactor. The targeted chemical elements are mainly nickel and cobalt, and to a lesser extent chromium.

The present invention thus relates to a method for treating, during an operating cycle, an internal surface of at least one metal part of a primary circuit of a water-cooled nuclear reactor, the metal part being made from a nickel-based or cobalt-based alloy selected from a steam generator tube, a pump or a fitting, the method comprising:

an estimation of a quantity of nickel liable to be discharged into the primary circuit by all the metal parts of the primary circuit in contact with the water of the primary circuit, during an operating cycle of the reactor;

a calculation of a quantity of magnetite necessary for fixing the whole of the quantity of nickel estimated;

formation of a treated water obtained by dissolving the quantity of magnetite calculated in the water of the primary circuit when the water has a temperature of between 80° C. and 180° C.; and putting this treated water in circulation in the primary circuit so as to form, on the internal surface of at least one metal part, a layer of a protective oxide able to fix all or part of the quantity of nickel estimated;

and wherein, a portion of the treated water circulating in the primary circuit being purified continuously, during the operating cycle, while being diverted into an auxiliary circuit comprising purification means and then reinjected into the primary circuit, the method furthermore comprises an injection, into this auxiliary circuit and downstream of the purification means, of an aqueous iron solution (Fe(II)), so as to compensate for the quantity of iron removed from the purified treated water by the purification means.

For the record, a water-cooled nuclear reactor operates by cycles that last for between one year and two years, and between which the reactor is shut down to unload the spent fuel, and then to reload new fuel. A complete operating cycle comprises in particular a start-up phase (where the temperature is below 180° C.), a phase of stabilisation at the hot shutdown temperature of 280° C. and a phase of operating at power (electricity production period), where the temperature varies between 286° C. and 330° C. with chemical conditioning of the primary circuit that is well defined in accordance with specifications declared to the nuclear safety authority (the water of the primary circuit then contains boric acid, lithium hydroxide and dihydrogen within limits that are variable according to the exhaustion of the nuclear fuel, but which are perfectly established).

The metal fitting parts may be a valve or a pump bearing for example.

Injection of aqueous iron takes place throughout the operating cycle; the injection may be continuous or discontinuous (but periodic). This injection compensates for the losses of iron.

In the context of the present invention, "aqueous solution of iron", "aqueous iron solution" or "aqueous iron" are spoken of indifferently; this means an aqueous solution containing dissolved iron, the iron having a degree of oxidation of +2. The chemical species containing the iron with a degree of oxidation of +2 can be very varied: hydroxides, acetates or other species of iron(II). Thus the iron in aqueous form Fe(II) can be introduced into an aqueous solution in a form complexed with a species of organic origin, for example an iron acetate or an iron hydroxide.

The use of iron in aqueous form (Fe(II)) is particularly advantageous since iron in aqueous form (Fe(II)) acts not only on nickel-based alloys (tubes of the steam generator) but also on the cobalt-based alloys that are used in the pumps and fittings (valves, pump bearings, etc) of the primary circuit. Which is particularly advantageous since cobalt is also activated under the effect of the neutrons in the core of the reactor.

The initial injection of $Fe_3O_4$, followed by an injection (continuous or discontinuous), throughout the operating cycle, of aqueous iron(II), have the effect of reducing the concentration of cobalts $^{58}Co$ and $^{60}Co$.

The injection is preferably implemented at a temperature of the purified treated water that is between 20° C. and 120° C. This facilitates the mixing of the aqueous iron with the primary fluid and limits precipitation phenomena.

The water of the primary circuit during the formation of the treated water preferably has a temperature of between 80° C. and 120° C.

Advantageously, the magnetite is introduced in powder form.

Advantageously, the duration of operation of the reactor is 12 months to 24 months.

Advantageously, the nickel-based alloy consists of an alloy comprising at least 60% by weight nickel and the cobalt-based alloy consists of an alloy comprising at least 60% by weight cobalt. The alloy is preferably selected from the A600 and A690 alloys for the nickel-based alloys, and from the Stellite™ alloys (without distinction in the family of these cobalt-based alloys) for the cobalt-based alloys.

According to one embodiment of the invention, the molar quantity of magnetite introduced into the water of the primary circuit is at least twice the molar quantity of nickel liable to be discharged.

Advantageously, the molar quantity of magnetite introduced into the water of the primary circuit is at least 20 moles.

BRIEF DESCRIPTION OF THE DRAWINGS

Other aspects, aims, advantages and features of the invention will appear better upon reading the following detailed description of a preferred embodiment thereof, given as a non-limitative example, and made with reference to the appended FIG. 1 (which is the only FIGURE):

FIG. 1 is a schematic representation of a primary circuit according to the invention.

DETAILED DESCRIPTION OF PARTICULAR EMBODIMENTS

The treatment method according to the invention advantageously exploits the fact that magnetite (which has a structure of the spinel type) contains iron in two degrees of oxidation Fe(II) and Fe(III). This particularity enables it to combine with the nickel, iron and chromium elements contained in the alloy of the steam generator tube, as well as with the cobalt element (resulting from irradiation of the nickel, before the treatment method of the invention is implemented, or present in the alloys forming the fittings and pumps of the primary circuit), in order to form:

on the internal surface of the steam generator tube, a layer of a protective oxide with a structure of the spinel type with the simplified general formula $AB_2O_4$, A being selected from Ni(II), Fe(II) and Co(II), and B being selected from Fe(III) and Cr(III);

on the internal surface of the metal parts of the primary circuit made from cobalt-based alloy (pumps, fittings), a layer of a protective oxide with a structure of the spinel type with the simplified general formula $AB_2O_4$, A being selected from Co(II) and Fe(II), and B being Fe(III).

By way of example, it is therefore possible to form a protective layer of a mixed oxide of molecular formula $Ni_xFe_{1-x}Fe_{2y}Cr_{2(1-y)}O_4$, for example a layer of $NiFe_2O_4$, or a layer of $FeCr_2O_4$, on the internal surface of a steam generator tube (for example a tube made from A600 or A690 alloy), and a protective layer of $CoFe_2O_4$ on the internal surface of the fittings and pumps (for example produced from a grade 4 Stellite™ alloy).

The layer of relatively insoluble oxide that is formed constitutes a barrier that limits, or even prevents, the discharge of nickel (coming from the corrosion of the tube) and the discharge of cobalt (coming from the corrosion of the fittings and pump) in the water of the primary circuit.

The presence of this or these layers of oxide reduces the duration of the cold shutdown of the nuclear reactors and consequently reduces the individual dosimetry of the personnel operating on the nuclear reactors during the maintenance operations.

As indicated in the prior patent application WO 2013/093382 A1 of the Applicant, introducing magnetite when the temperature of the water of the primary circuit is between 80° C. and 180° C. (optionally between 80° C. and 120° C.) is a point essential to the success of the treatment.

In a known manner, the fluid of the primary circuit is operated in a basic, reducing medium during normal operation of the reactor and hot shutdowns, thus minimizing widespread corrosion. Generally, the primary fluid thus contains boric acid, lithium hydroxide and dissolved dihydrogen. More precisely, the water of the primary circuit constitutes a reducing medium by virtue of the addition of dihydrogen in a concentration that is generally from 25 mL/kg to 50 mL/kg (at 0° C., 1 bar). All reactors of PWR technology use hydrogen in $H_2$ form to combat radiolysis of the primary fluid. In such a medium, magnetite has the particularity of being more soluble at a temperature between 80° C. and 180° C., than at the nominal operating picture of the reactor, namely typically a temperature of between 286° C. and 330° C.

The lower temperature limit of 80° C. is necessary to avoid the formation of ferrous hydroxide $Fe(OH)_2$. This is because, at temperatures below this low limit, the formation of protective spinel on the alloys is compromised and the compactness of the oxides formed is generally not good. As for the upper limit temperature of 180° C. (or even 120° C.), this corresponds to a limit temperature preceding the temperature rise of the reactor in nominal operation. For the record, a complete operating cycle comprises a start-up phase (that lasts for a few days), a stabilisation phase at the hot shutdown temperature (which also lasts for a few days), a nominal operating phase (which last for several months and during which the power station produces electricity), and then finally a phase of shutdown of the installation to replace the spent nuclear fuel.

In practice, the magnetite is therefore generally introduced into the water of the primary circuit when the nuclear reactor is shut down, typically before the divergence of the reactor. It then dissolves wholly or partly in the water of the primary circuit. After circulation in the primary circuit, the magnetite contained in the water thus treated can then be put in contact aqueously with the internal surface of a metal part of the reactor selected from a steam generator tube, a pump or a fitting, in order to form thereon the protective oxide layer.

The treatment method according to the invention is intended to be implemented on a primary circuit of a water-cooled nuclear reactor, for example of the pressurised water reactor (PWR) type. The magnetite can be introduced into any part of the primary circuit where the temperature is between 80° C. and 180° C., at the start of an operating cycle, namely during the phase of (re)start of the nuclear reactor. By way of examples, the magnetite can be introduced into the water of the primary circuit of the reactor via a metering pump, at the outlet of the RCV circuit, or be placed in a filter of the primary circuit at the outlet of the RCV circuit.

The magnetite is for example introduced in powder form, in order to favour dissolution thereof.

The quantity of magnetite introduced into the water of the primary circuit is such that it makes it possible to form in situ a layer of a protective oxide on one or more metal parts of the primary circuit made from nickel- or cobalt-based alloy, for fixing all or part of the nickel or cobalt liable to be discharged into the primary circuit by the nickel-based metal parts of the primary circuit or cobalt-based parts of the primary circuit, throughout the operating cycle of the reactor. To characterise the layer of oxide and to estimate the quantity of magnetite to be introduced, the quantity of nickel is considered, rather than the quantity of cobalt or chromium, since these two species are in fact in a minority and highly variable in the mass balance of the species discharged into the primary circuit. They can therefore always be ignored in calculating the mass of iron(II) to be injected into the primary circuit.

In order to determine in advance the quantity of magnetite to be introduced into the water of the primary circuit for a given operating period, it is possible to measure the amount of nickel in the primary water circuit over the same operating period, using for example a technique such as chemical or potentiometric determination or using the radiochemical readings of the industrial installation during the reactor shutdowns, i.e. measuring the area of the cobalt 58 and 60 radioactivity peaks to estimate the mass of Ni and Co released during the shutdown.

Alternatively, the quantity of nickel liable to be discharged is calculated by comparing the height of the radioactivity peak observed when the reactor is shut down with the ratio of the nickel giving the ratio between the concentration of nickel and the total radioactivity conveyed by the water of the primary circuit (the ratios by chemical element are values known to a person skilled in the art and declared by the operator to the nuclear safety authority). Knowing the ratio of the nickel (ratio_Ni) and by measuring the total radioactivity of the water of the primary circuit when the reactor is shut down, it is possible to estimate the concentration of the nickel present in the water of the primary circuit by the following calculation:

$$\text{Total radioactivity} \times \text{ratio\_Ni} = \text{concentration of nickel}$$

Knowing the volume of water of the primary circuit, it is then possible to calculate the total quantity of nickel that it is necessary to fix on the layers of protective oxide by the following calculation:

concentration of Ni×volume of the primary circuit=quantity of Ni

The duration of operation separating two shutdowns of the reactor (i.e. operating cycle) is generally 12 months to 24 months, preferentially 18 months.

A steam generator tube for its part typically consists of an alloy comprising at least 60% by weight nickel, preferentially from 60% to 75%. It is for example an alloy selected from the A600 or A690 alloys.

The result of these parameters is that the quantity of nickel discharged following the corrosion of the steam generator tube is then in general, after 18 months of operation of the reactor, respectively at least 10 moles, preferentially from 20 moles to 50 moles.

The molar quantity of magnetite to be introduced into the water of the primary circuit is determined by considering that it corresponds to at least twice the molar quantity of nickel liable to be discharged. It is thus in general respectively at least 20 moles (4.6 kg of magnetite), preferentially from 40 moles (9.2 kg of magnetite) to 100 moles (23 kg of magnetite).

As explained above, the quantity of magnetite introduced into the primary circuit decreases over time. This is because a small fraction (typically less than 1%) of the flow of water of the primary circuit is diverted to an RCV auxiliary circuit containing purification means that will eliminate the chemical species (aqueous and solid species) transported by the water. In fact, all the elements Fe, Ni, Co, etc are purified from the portion of the primary fluid that passes in the RCV circuit.

Approximately in a hundred hours, the primary fluid has entirely passed through the purification circuit of the RCV. The loss of iron will, each time the primary fluid is renewed, be $$\text{mass\_iron\_loss} = \text{equilibrium\_concentration} \times \text{mass\_primary\_water}$$

where "mass_iron_loss" is the mass of iron retained by the purification means each time the primary fluid is completely renewed (in kg) (and therefore per hundred hours), "equilibrium_concentration" is the mean equilibrium concentration of the magnetite under the physical and chemical conditions encountered during the power operation of the reactor (in $kg/kg_{water}$)) and "mass_primary_water" is the mass of water contained in the primary circuit in operation (in kg).

Knowing that "equilibrium_concentration" is equal to $9\times10^{-8}$ $mol/kg_{water}$ or $5\times10^{-9}$ $kg/kg_{water}$ (varies by less than a factor of 2 over all the physical and chemical conditions encountered during the power operation of the reactor) and that "mass_primary_water" is equal to $300\times10^{3}$ kg (varying according to the design and power of the reactor), the loss of iron, each time the primary fluid is renewed, is thus approximately 0.027 moles, i.e. 1.51 g. The loss of iron, because of the purification of the primary fluid, over a 18-month cycle, is therefore (365 days/12 months)×18 months×(24 hours/day)/100 $hr_{purification}$=131 complete renewals by purification, i.e. of the order of 0.2 kilograms of iron (or 3.58 mol of iron) lost in the water of the primary circuit over the whole of the period of an operating cycle of the reactor. The loss of iron depends directly on the purification rate. However, it remains of the order of one kilogram per operating cycle.

The improvement to the existing method consists in compensating for the losses of magnetite intentionally introduced, losses caused by the means for purifying the water, by injecting aqueous iron into the RCV circuit at the outlet from the purification means, thus compensating for the losses of iron. The undesirable elements are therefore properly removed from the purified portion of the primary fluid, while preserving the quantity of iron necessary for forming the layers of protective oxide.

This process for purifying a portion of the primary water is in action throughout the operating cycle of the reactor. The improvement to the method therefore consists in compensating for the losses of the iron element by intentionally introducing it, continuously or discontinuously, into the purified water that returns into the primary circuit.

Injecting iron in the form of aqueous iron during the operating cycle has the advantage of being easier to implement than introducing magnetite, since the quantity of iron to be compensated for by this injection during the operating cycle is much smaller than the quantity of iron initially injected when the reactor is started up. Furthermore, it is easier to inject iron as required and in small quantities over time, than on a single occasion in a large quantity, since it is a case here of compensating for a small loss of iron caused by the operation of the RCV circuit, knowing that the initial injection of iron (in the form of magnetite) should, in theory, have sufficed to block the nickel and cobalt on the original sources.

The total quantity of aqueous iron to be introduced during a cycle for compensating for the losses of iron depends on the quantity of primary fluid purified by the RCV circuit, and therefore on the purification rate $Q_{purification}$ according to the following formula:

$$Q_{injection}(\text{Fe}) \times C_{makeup}(\text{Fe}) = Q_{purification} \times C_{solubility}(\text{magnetite})$$

where $Q_{injection}$(Fe) is the flow rate of the injection system used for injecting the aqueous iron solution (Fe (II), $C_{makeup}$(Fe) is the concentration of iron of the aqueous iron solution (Fe (II) injected, $Q_{purification}$ is the flow rate of the RCV circuit and $C_{solubility}$(magnetite) is the mean solubility of the magnetite under the physical and chemical conditions of the PWRs.

Knowing that $C_{solubility}$(magnetite) is between $[2\text{ to }8]\cdot10^{-9}$ kg of iron per kg of water, that $Q_{purification}$ is equal to approximately 10 tonnes per hour ($10\cdot10^{3}$ kg/h) for a diversion of approximately 1% of the flow of primary water in the RCV circuit, and that the cycle duration of 18 months corresponds to (365 days×24 hours×18/12), i.e. 13140 hours, if the value of $C_{solubility}$(magnetite) is taken to be equal to $5\cdot10^{-9}$ kg of iron per kg of water, a loss of 0.657 kg of iron for a cycle of 18 months is obtained.

In short, it is therefore necessary to introduce the equivalent of a little less than 1 kg of supplementary iron per operating cycle of 18 months (to be adjusted according to the purification rate used and the duration of the operating cycle).

An example of a schematic representation of a primary circuit 1 of a water-cooled nuclear reactor according to the invention is shown in FIG. 1. It includes a reactor core 2, a steam generator 3, a pump 4 and an RCV circuit 5 having purification means 6. The case of a diversion of 1% of the flow of the primary water in the RCV circuit has been shown here. In the RCV circuit 5 at the outlet of the purification means 6, a quantity of aqueous iron is injected using injection means 7 to compensate for the loss of iron.

The aqueous iron is injected downstream of the purification means of the auxiliary circuit. Preferably, the injection takes place in a zone of the RCV circuit, not only located downstream of the purification means, but also where the temperature of the primary fluid is between 20° C. and 120° C. This facilitates mixing thereof with the primary fluid and limits the precipitation phenomena that may appear above 120° C. if the mixing of the solution injected with the water of the primary circuit is not sufficient.

In a known manner and as stated previously, the fluid of the primary circuit during the normal operation of the reactor is a basic and reducing medium. Preferably, the aqueous iron solution injected is also a reducing medium, in order not to disturb the chemical conditioning imposed on the primary circuit (pH and redox). The aqueous iron solution Fe(II) can for example be prepared in the absence of $O_2$, and therefore under vacuum, or better in a water containing dissolved dihydrogen, for example by adding hydrogen at a concentration of between 5 mL/kg and 50 mL/kg (at 0° C., 1 bar).

The invention claimed is:

1. A method for treating, during an operating cycle, an internal surface of at least one metal part of a primary circuit of a water-cooled nuclear reactor, the metal part being made from a nickel-based or cobalt-based alloy selected from a steam generator tube, a pump or a fitting, the method comprising:

estimating a quantity of nickel liable to be discharged into the primary circuit by all the metal parts of the primary circuit in contact with the water of the primary circuit, during an operating cycle of the reactor;

calculating a quantity of magnetite necessary for fixing the whole of the quantity of nickel estimated;

forming a treated water obtained by dissolving the quantity of magnetite calculated in the water of the primary circuit when the water has a temperature of between 80° C. and 180° C.; and putting said treated water in circulation in the primary circuit so as to form, on the internal surface of at least one metal part, a layer of a protective oxide able to fix all or part of the quantity of nickel estimated;

diverting a portion of the treated water circulating in the primary circuit during the operating cycle into an auxiliary circuit comprising a purification device;

purifying the portion of the treated water using the purification device;

reinjecting into the primary circuit the purified treated water; and injecting, into said auxiliary circuit and downstream of the purification device, an aqueous iron solution, so as to compensate for a quantity of iron removed from the purified treated water by the purification device.

2. The treatment method according to claim 1, wherein the injecting is implemented at a temperature of the purified treated water between 20° C. and 120° C.

3. The treatment method according to claim 1, wherein the water of the primary circuit during the forming step has a temperature of between 80° C. and 120° C.

4. The treatment method according to claim 1, wherein the magnetite is introduced in powder form.

5. The treatment method according to claim 1, wherein a duration of the operating cycle is 12 month to 24 months.

6. The treatment method according to claim 1, wherein the nickel-based alloy consists of an alloy comprising at least 60% by weight nickel and the cobalt-based alloy consists of an alloy comprising at least 60% by weight cobalt.

7. The treatment method according to claim 6, wherein the alloy is selected from alloys comprising 60-75% nickel by weight for the nickel-based alloys, and from alloys comprising Co, Cr and C and W or Mo for the cobalt-based alloys.

8. The treatment method according to claim 1, wherein a molar quantity of magnetite introduced into the water of the primary circuit is at least twice a molar quantity of nickel liable to be discharged.

9. The treatment method according to claim 8, wherein the molar quantity of magnetite introduced into the water of the primary circuit is at least 20 moles.

10. The treatment method according to claim 1, wherein the aqueous iron solution is Fe (II).

11. The treatment method according to claim 1, wherein the purification device purifies the diverted portion of the treated water continuously during the operation cycle.

* * * * *